United States Patent
Beyer et al.

(10) Patent No.: US 7,102,316 B2
(45) Date of Patent: Sep. 5, 2006

(54) MECHANICAL PRESS

(75) Inventors: Joachim Beyer, Ravensburg (DE); Hans Hofele, Göppingen (DE); Andreas Lauke, Gruibingen (DE)

(73) Assignee: Schuler Pressen GmbH & KG, Göppingen (DE)

( * ) Notice: Subject to any disclaimer, the term of this patent is extended or adjusted under 35 U.S.C. 154(b) by 0 days.

(21) Appl. No.: 11/032,339

(22) Filed: Jan. 10, 2005

(65) Prior Publication Data
US 2005/0189900 A1    Sep. 1, 2005

(30) Foreign Application Priority Data
Feb. 26, 2004    (DE) .............. 10 2004 009 256

(51) Int. Cl.
    *G05B 11/32* (2006.01)
(52) U.S. Cl. .............. 318/625; 318/560; 318/569; 318/594; 318/600; 318/630; 100/144; 100/178; 100/179; 100/214
(58) Field of Classification Search ......... 318/560–630
    See application file for complete search history.

(56) References Cited

U.S. PATENT DOCUMENTS

| | | | |
|---|---|---|---|
| 5,293,106 A * | 3/1994 | Miyamoto .............. | 318/568.1 |
| 5,298,843 A * | 3/1994 | Miyajima et al. .......... | 318/567 |
| 5,832,816 A * | 11/1998 | Seto et al. ................. | 100/48 |
| 6,316,903 B1* | 11/2001 | Shamoto .................. | 318/700 |
| 6,337,042 B1* | 1/2002 | Nakashima et al. ....... | 264/40.5 |
| 6,384,561 B1* | 5/2002 | Niizuma et al. ........... | 318/625 |

FOREIGN PATENT DOCUMENTS

| EP | 0 536 804 | 8/1996 |
|---|---|---|
| JP | 2000-312995 | * 11/2000 |

* cited by examiner

Primary Examiner—Lincoln Donovan
Assistant Examiner—Tyrone Smith
(74) Attorney, Agent, or Firm—Klaus J. Bach

(57) ABSTRACT

In a press having a plunger supported so as to be movable linearly back and forth by drive means which include at least one servomotor in combination with a rotatably supported inertia structure connected for rotation with the servomotor, the inertia structure has an inertia moment which is small enough to permit reversal of the servomotor within a stroke length of the plunger so that the stroke of the plunger is adjustable under the control of a control device connected to the servomotor for controlling its operation.

11 Claims, 5 Drawing Sheets

MECHANICAL PRESS

BACKGROUND OF THE INVENTION

The invention relates to a mechanical press for example for shaping metal sheets but also for forming massive parts. The press includes a plunger which is movable back and forth by a drive arrangement.

Mechanical presses generally include a main drive with a shaft which is driven by one or several electric motors and which drives one or more eccenters which are directly connected to a plunger by a connecting rod or indirectly by a bell crank. The main shaft is connected to a flywheel which compensates for load variations and which makes the rotation of the main shaft more uniform.

With such presses, the distance-time curve which the plunger follows is determined by the eccenter drive or possibly a bell crank drive. Even if the stroke of the plunger is adjustable the basic distance-time characteristic cannot be changed.

Therefore presses have been proposed wherein the eccenter driving the plunger is driven by a servomotor.

Such an eccenter press is known from DE 41 09 796 C2. Herein, it is proposed to couple an eccenter directly to a servomotor and to connect the plunger to the eccenter by way of a connecting rod. The upper and lower end points of a back and forth movement of the plunger can be variably determined by a flexible control of the servomotor. The servomotor does not rotate uniformly but moves back and forth. Depending on the anglular range of the rotation of the eccenter and depending on the part of the annular movement of the eccenter, the stroke and force generated by the press are different.

In this arrangement, the servomotor needs to generate the force required for the forming of the material at any time. There is no flywheel for releasing stored forces in support of the drive motor.

EP 0 536 804 also discloses a press which is driven by a servomotor but which includes a bell crank drive. The servomotor drives an eccenter by way of a worm drive, the eccenter being connected to the bell drive by way of a connecting rod.

By an appropriate control of the servomotor in either a back and forth operating manner or in a continuous operation, the desired travel distance-time curve for the plunger can be obtained. But also, in this case, the maximum force to be provided by the plunger must be fully supplied by the drive, particularly the drive connecting the servomotor to the eccenter. The otherwise equalizing effect of the flywheel which reduces the load on the drive components disposed between the drive motor and the eccenter is not present. Consequently, the load on the teeth of the worm drive is very high. This is particularly apparent when such a press is to be designed for high press forces.

It is the object of the present invention to provide a motor-driven press which is simple and sturdy in its design and which has a relatively high loading capacity.

SUMMARY OF THE INVENTION

In a press having a plunger supported so as to be movable linearly back and forth by drive means which include at least one servomotor in combination with a rotatably supported inertia structure connected for rotation with the servomotor, the inertia structure has an inertia moment which is small enough to permit reversal of the servomotor within a stroke length of the plunger so that the stroke of the plunger is adjustable by a control device connected to the servomotor for controlling its operation.

The servomotor or motors operate the plunger by way of a drive which includes an inertia moment. When needed, this inertia moment can be increased by an additional flywheel. Altogether, however, the inertia moment is not as large as it is in conventional presses wherein the flywheel stores enough energy to execute an operating stroke. Rather, it is so low that the servomotor or motors can accelerate the flywheel form standstill and can again slow it down when, in such a procedure, the plunger performs maximally one upward and one downward stroke. If the plunger travel distance is measured as a rotation of an eccenter shaft in degrees, the combined acceleration and deceleration travel distance is not more than 360°. This means that the drive torque of the servomotor or the total drive torque of all servomotors applied to the respective mass inertia moment is so large that the plunger can be accelerated to the desired value during a plunger travel distance of 180°. Also, the deceleration provided by the servomotors occurs over a distance of 180°. As a result, the press can be operated reversibly with variable operating strokes while the flywheel accommodates force peaks which result from the working of the workpieces and which therefore do not have to be generated solely by the servomotors. It is therefore possible to operate the presses in reversing operation with variable strokes wherein the flywheel ensures that force peaks which result from working the workpiece do not have to be accommodated alone by the servomotors.

The drive connections between each servomotor and the inertia mass only have to be designed for the maximum torque of the servomotors. This applies to the case where the servomotors are connected for example each by its own eccenter and connecting rod to the plunger as well as where the servomotors are connected to a common eccenter. If, for example, in the last case only one eccenter is provided which is operatively connected to a spur gear of larger diameter for rotation therewith, the pinion gears of several motors may be in engagement with such a large-diameter spur gear. Then the drive torque is transmitted to the spur gear by several pinions. As a result, the number of torque-transmitting teeth of the spur gear is substantially larger than with the use of a single strong servomotor whose pinion is in engagement with the spur gear. With the use of several servomotors jointly driving the spur gear, smaller and axially shorter teeth, that is narrower spur gears can be used which greatly reduces costs. Furthermore, there are different force transmission points distributed over the circumference of the spur gear which reduces also the load on the support structures. The disadvantages encountered with the omission of a large flywheel can therefore be compensated for, or even overcompensated. On the other hand, the advantage is obtained that any travel distance-time curve can be generated. It is particularly possible to extend the opening periods of a tool, that is the plunger can be held over an extended period in an upper position. In this way, the transfer of the workpiece is facilitated. In eccenter presses with constant speed, that is non-controllable drive motors wherein the eccenter movement cannot be slowed down during positioning of the work piece, a substantially larger stroke would be necessary for obtaining the same tool opening time at the same number of strokes.

In a preferred embodiment, the servomotors are coupled together in a drive unit whereby they are also synchronized. This basic concept provides for a particularly simple control of the servomotors. A first one is position controlled or operated by a position control arrangement and forms a master. The others which are mechanically coupled motors form slaves without their own position controllers. They only receive the same control impulses as the master.

In a particular embodiment, the slave motors are controlled each by its own torque controller so that it is ensured that the slave motors generate the same torque as the master. Although this solution requires more control expenses, it may be advantageous in view of the uniform torque distribution achieved thereby.

But it is also possible to control the servomotors in ways different from one another so that they supplement each other. For example, a first servomotor may be position-controlled and a second motor or additional motors may be torque-controlled. The control arrangement may then provide a travel distance-time curve for the position-controlled servomotor and a torque-time curve for the other servomotors. Both curves may be dynamically tuned to one another.

For example, the torque control may be made dependent on the control deviations occurring at the position controlled servomotor.

It is considered to be particularly advantageous if several servomotors drive a common spur gear which is connected to an eccenter. Such a drive is relatively inexpensive and sturdy and rigid. Since the force is transmitted by several pinions which are all in engagement with the spur gear, the whole force needed for the deformation of the workpiece can be transferred by way of this drive.

The servomotors are preferably brake motors, that is, they are either provided with a mechanical brake which brakes the motors down when it is de-energized or they can be held in a predetermined position by electrical control signals. Then plunger brakes are not necessary or they can be greatly simplified. The plunger can be braked and stopped in certain positions by the servomotors.

It is furthermore possible to adjust the stroke lengths. If needed however, a particular desired travel distance—time curve for the plunger may be provided for the plunger around the lower dead center position independently of the length of the stroke.

It is also possible to connect the several servomotors to the plunger without mechanical coupling, that is independently from one another, for example by way of eccenter drives or other drives which convert the rotational movement to a linear movement. In this case, preferably at least two servomotors which are operatively connected to the plunger at different locations are operated in a position-controlled manner. In this way, the servomotors are synchronously operated in order to achieve a parallel plunger movement. It is furthermore possible to operate the two motors specifically with different movement curves so that the plunger cannot only move in a parallel fashion but can also be pivoted. Additional servomotors may then be connected to the leading two master servomotors as slave motors.

Particulars of advantageous embodiments of the invention will be described below on the basis of the accompanying drawings.

DESCRIPTION OF PREFERRED EMBODIMENTS

Figure 1:
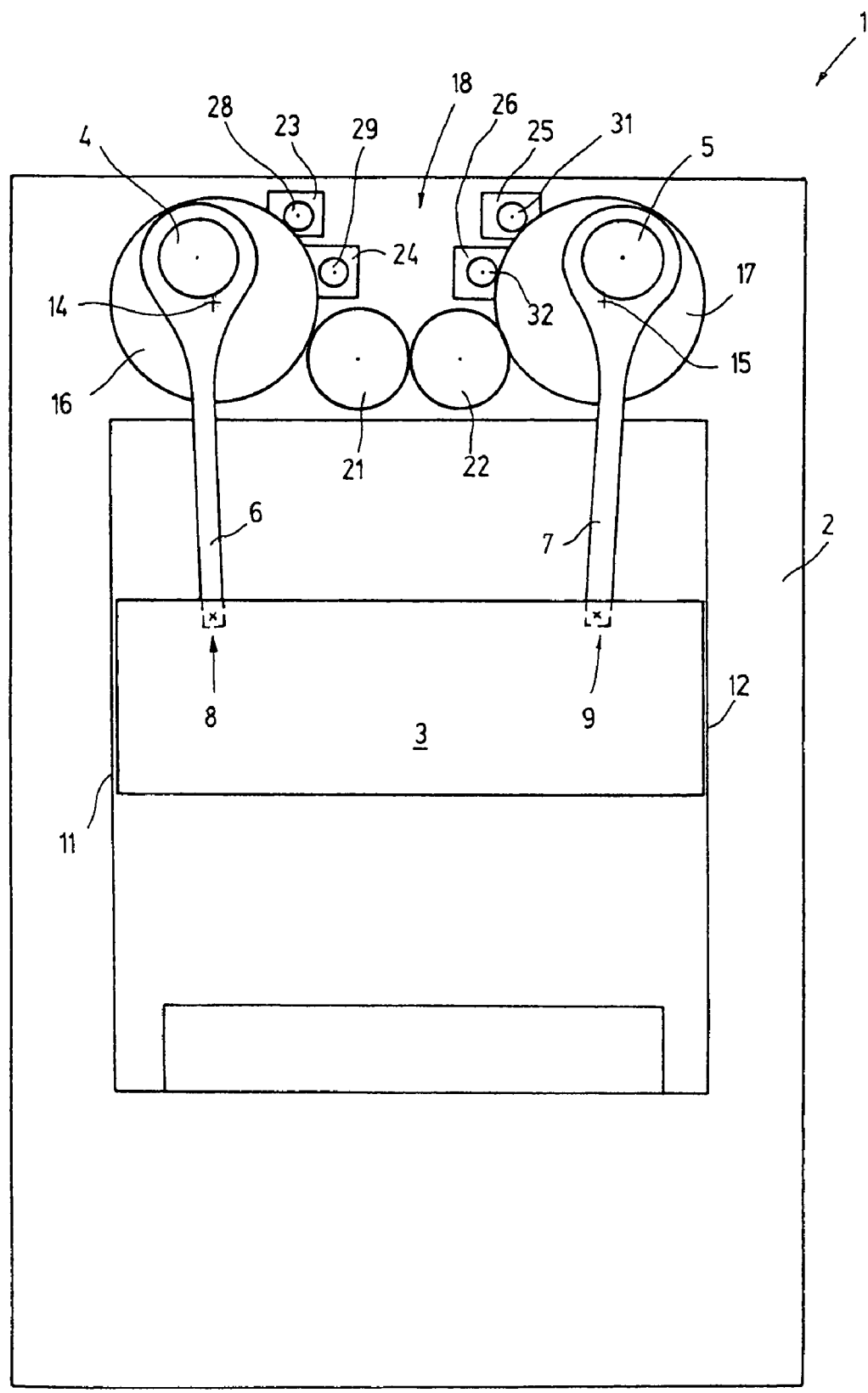
FIG. 1 schematically shows a press with several servomotors.

FIG. 1 shows a press 1 with a frame 2 on which a plunger 3 is supported so as to be movable up and down by two eccenters 4, 5, which are connected to the plunger 3 by connecting rods 6, 7. The connecting rods 6, 7 are pivotally connected to the plunger 3 at spaced locations 8, 9. Side guide structures 11, 12 guide the plunger 3 along the frame 3 for linear movement of the plunger 3.

The eccenters 4, 5 which may also be cranks are supported so as to be rotatable eccentrically about axes of rotation 14, 15 and are firmly connected to spur gears 16, 17, which are supported concentrically with the axes of rotation 14, 15. the spur gears 16, 17 are part of a drive 18, which includes also gears 21, 22, which couple the two spur gears 16, 17. The gears 21, 22 which are in engagement with each other and with the spur gears 16, 17 consequently provide for a drive connection between the spur gears 16, 17 and ensure their synchronism rotation in opposite directions.

The spur gear 16 is driven by two servomotors 23, 24 while the spur gear 17 is driven by two additional servomotors 25, 26. The servomotors 23, 24, 25, 26 carry on their output shaft pinions 28, 29, 31, 32, wherein the pinions 28, 29 are in engagement with the spur gear 16 and the pinions 31, 32 are in engagement with the spur gear 17. They engage the respective spur gear 16, 17 in circumferentially spaced relationship. Consequently, the plunger 3 is driven altogether by four servomotors 23, 24, 25, 26 of which two in each case drive a common eccenter 4 and 5, respectively. For each eccenter, additional motors may be provided if needed whose pinions would then also be in engagement with the respective spur gear 16 or 17.

The inertia moment of the drive 18 formed by the inertia masses and the other drive elements are selected to be so high that the maximum mechanical energy which can be generated by the servomotors 23, 24 over a plunger movement corresponding to 180° rotation of the spur gears can be stored and the spur gear can be accelerated from standstill to nominal speed. Also, the drive including its inertia masses can be decelerated by the servomotors 23, 24 over 180° from nominal speed to zero. The nominal speed in this connection is to be understood to be a speed which would be used in a continuous operation. A deviation from such a ratio between drive torque of the servomotors, or, respectively the mechanical energy generated thereby and the mechanical energy stored by the inertia masses of 1:1 would require that, under the given conditions, either the servomotors must be excessively large (when the flywheel is not large enough) or a reversing operation of a press with a reasonable stroke number would not be possible (when the flywheel is too large). In accordance with the invention, a balance is provided wherein, on one hand, the flexibility of a servomotor driven press is obtained and, on the other hand, the construction and technical expenses concerning the size of the servomotors and the controls is minimized.

Figure 3:
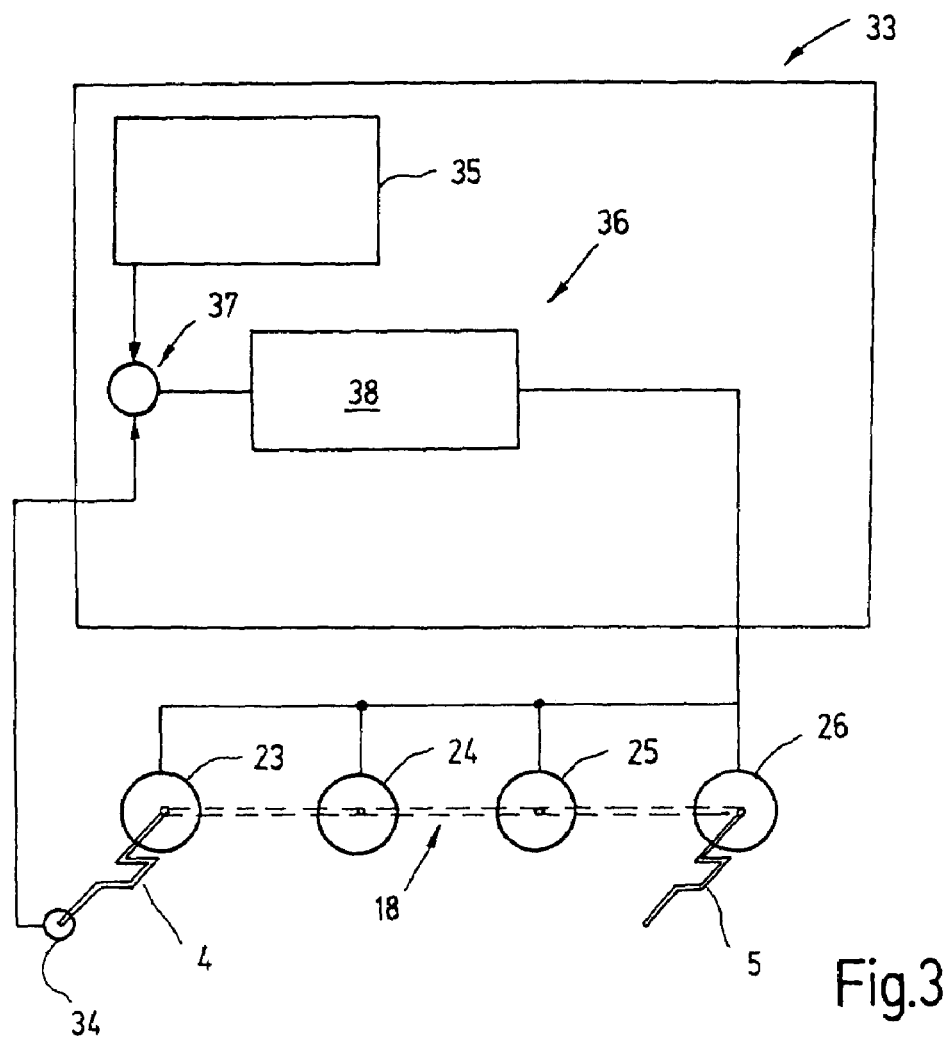
FIG. 3 shows schematically several mechanically coupled servomotors of a press and the control arrangement therefore.

FIG. 3 shows a control arrangement 33 for the servomotors 23, 24, 25, 26. In this arrangement, for example, the servomotor 23 is position-controlled. For this purpose, it is provided with an angular position sensor 34, which accurately detects the angular position of the eccenter 4 and supplies corresponding sensor signals to the control arrangement 33. The control arrangement 33 includes a module 35 generating a travel distance-time curve of the plunger 3, or respectively, corresponding angular position-time value pairs for controlling the servomotor 23. These control values are supplied to a control circuit 36 which includes, in addition to the servomotor 23 and the position sensor 34, a comparator 37 and a control amplifier 38, which, at its output, provides control signals for the servomotor 23. The servomotors 24, 25, 26 are also connected - in parallel - to the output of the amplifier 38 or they are connected to separate amplifier outputs providing the same control signals. All these servomotors therefore generate the same torque as the position controlled servomotor 23. synchronous operation of the servomotors 23 to 26 is indicated in FIG. 3 schematically by a dashed line connection 18.

Below the operation of the servo press 1 will be described:

The module 35 provides during operation the travel distance-time curve for the plunger movement and supplies a corresponding time-dependent control signal to the comparator 37. By way of the control amplifier 38, the servomotor 23 and, together therewith, the servomotors 24, 25, 26 are so controlled that the movement of the eccenters 4, 5 and, consequently, the movement of the plunger 3 correspond to the control signal. The control signal may provide for example for a rotation of the servo motors 23 to 26 without reversal of the direction of rotation if the plunger is to perform its maximum stroke. If only a partial stroke is required the control signal provides for a back and forth rotation of the servomotors 23 to 26 wherein the rotational speed may vary between zero and maximum but may also assume intermediate values. If a working stroke is performed the plunger 3 moves downwardly to close a tool disposed on the press table. The energy required for the deformation of the workpiece must be provided by the servomotors 23 to 26 at any point in time. No power is derived from a flywheel or similar device. Because of the uniform torque distribution, the servomotors 23 to 26 provide essentially the same amount of energy. By the use of several servomotors arranged in parallel a high deformation power can be generated with a relatively small load on the drive components. A certain force compensation may be provided by the weight of the plunger 3 if this is not compensated for by corresponding force generators which generate a force effective on the plunger 3 in an upward direction. If these force generators are not present or they are not large enough so that the weight force of the plunger 3 is undercompensated, the weight force is effective in the working direction of the plunger 3 and supports the servomotors 23 to 26 during the deformation phase. Then however the servomotors 23 to 26 have to generate on increased force during opening of the tool in order to lift the plunger. If the weight force of the plunger 3 corresponds to half the maximum required deformation force, it is sufficient if the servomotors 23 to 26 are dimensioned to provide half of the deformation force. Such a force then would have to be generated by the servomotors in both directions of rotation that is during the closing and the opening stroke.

The servomotors 23 to 26 require power peaks from the power supply net corresponding to the maximum power peak required for the deformation of the workpiece. If the electric power network is not capable of satisfying those requirements, the requirements can be satisfied by energy storage devices such as buffer equipment like flywheel-supported Leonard power generators or similar motor generator sets.

The advantage of the press 1 with several servomotors 23 to 26 as presented herein resides in the combination of the flexibility which can be achieved with the servomotors with the possibility of dimensioning the drive required for operating the plunger 3 for reduced costs.

Figure 2:
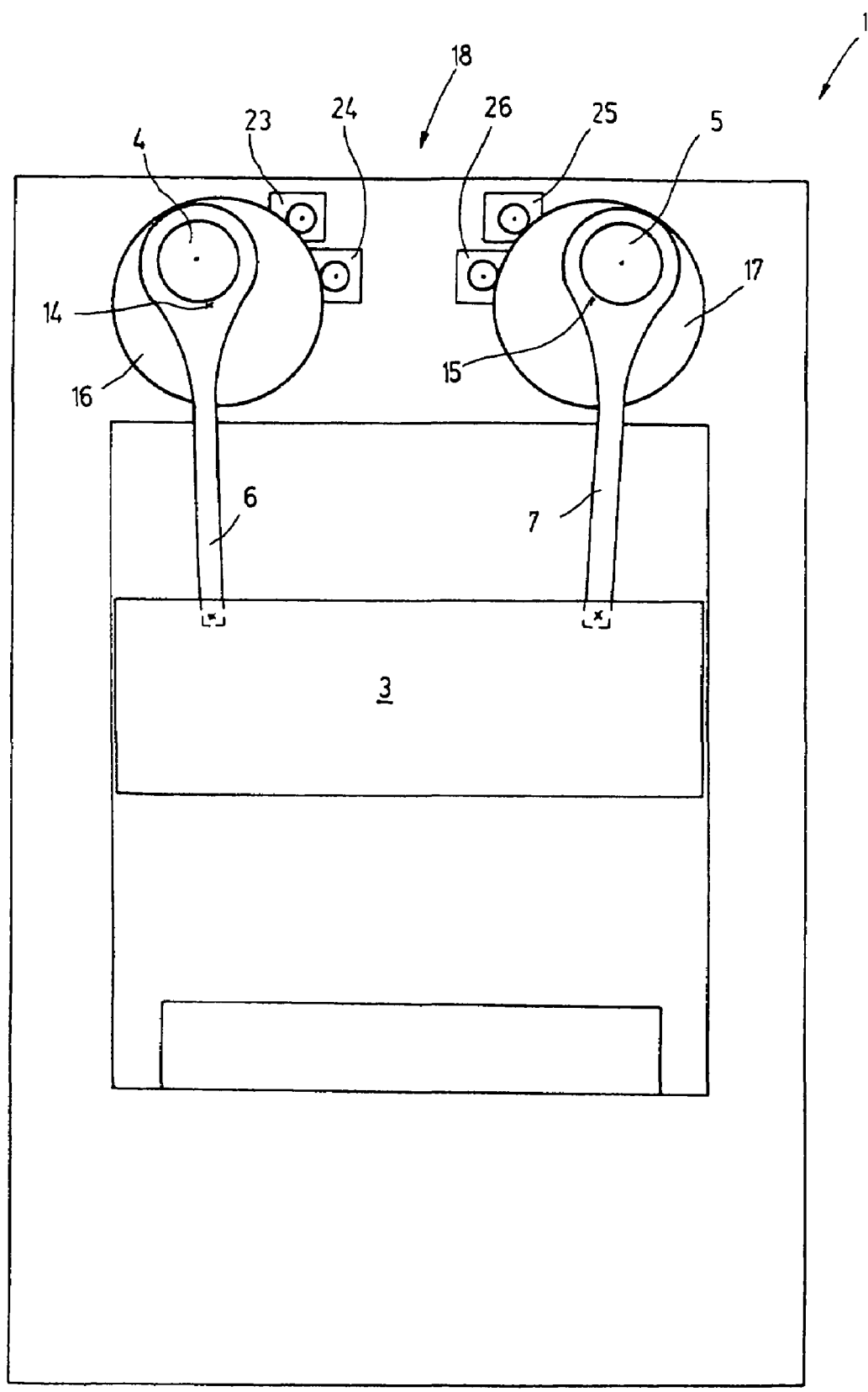
FIG. 2 shows schematically another embodiment of a press with several servomotors.
Figure 5:
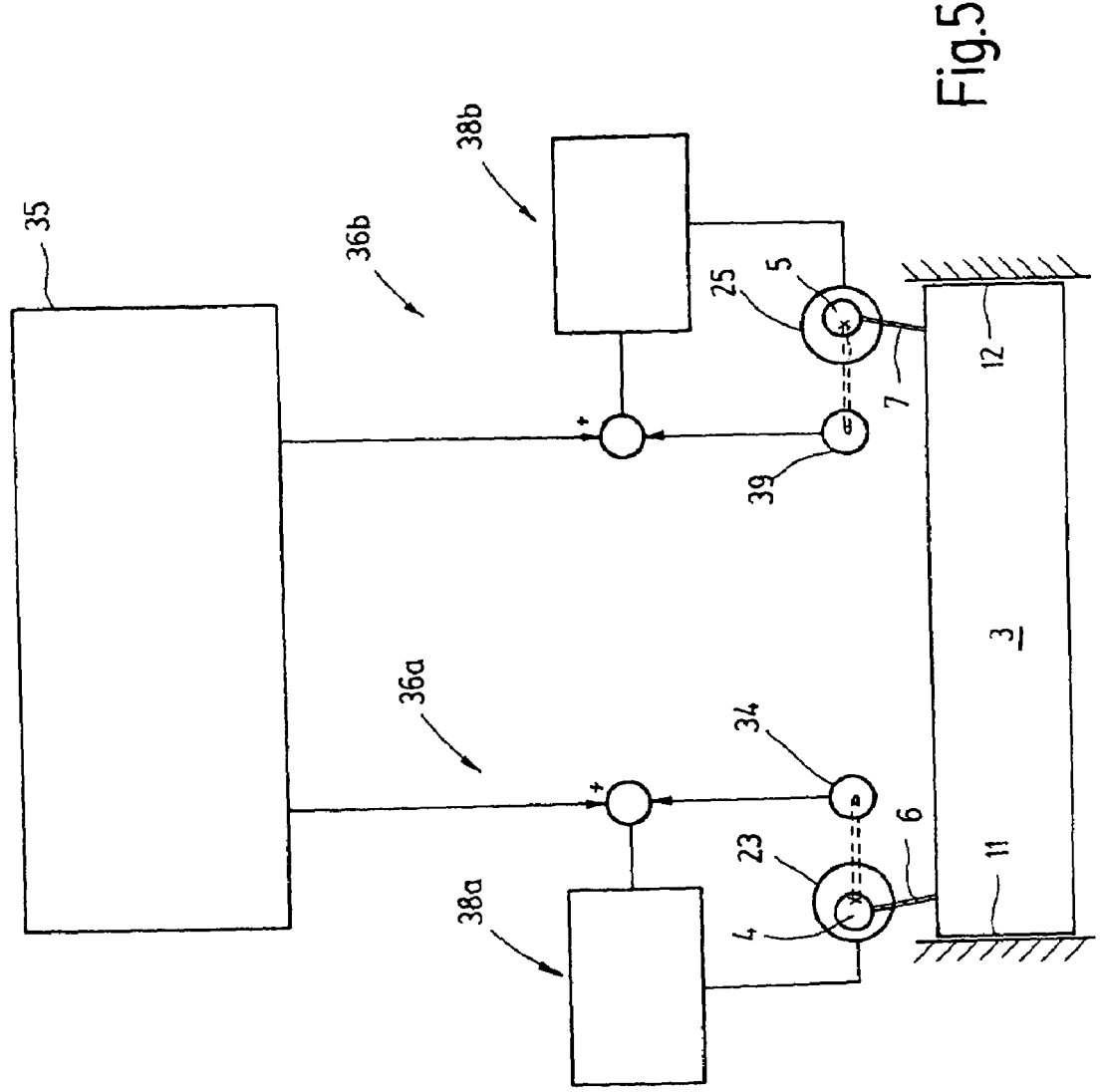
FIG. 5 shows schematically servomotors driving a common plunger and the control arrangement therefore.

FIG. 2 shows an embodiment of the press 1 to which the description of the arrangement of FIG. 1 applies and the same reference numerals are therefore used for identical components. In the arrangement as shown in FIG. 2, the gears 21 and 22 of FIG. 1 are eliminated. The drive 18 therefore connects the servo motors 23, 24 and 25, 26 with the spur gears 16 and 17 respectively, but the spur gears 16 and 17 are not engaged with each other. Rather, they jointly drive the plunger 3 by way of their connecting rods 6, 7. Synchronous operation of the two eccenters 4, 5 is achieved by a corresponding control of the servomotors 23, 24 and 25, 26 in accordance with FIG. 5. The module 35 provides for each of two parallel control circuits 36a, 26b, the desired curve of movement.

In the most simple case, the two curves of movement are identical. The control circuit 36a guides the servomotor 23 whose position is detected by the position sensor 34. The control circuit includes a control amplifier 38a. The servomotor 25 is also provided with a position sensor 39 which provides the position of the servomotor 25 to the control circuit 36b which includes a control amplifier 38b. The other servomotors 24, 26 may be connected parallel to the servomotors 23, 25 as in the arrangement of FIG. 3. The plunger 3 executes a linear back and forth movement but it may be supported so as to permit tilting of the plunger 3. Then different control signals may be supplied to the control circuits 36a, 36b. The module 35 may then provide slightly different curves to the control amplifiers 38a and 38b in order to provide for tilting of the plunger 3. The tilting of the plunger may be employed for example during closing of the tool near the lower dead center to move the force maximum generated by the plunger 3 in a direction transverse to the plunger 3.

Figure 4:
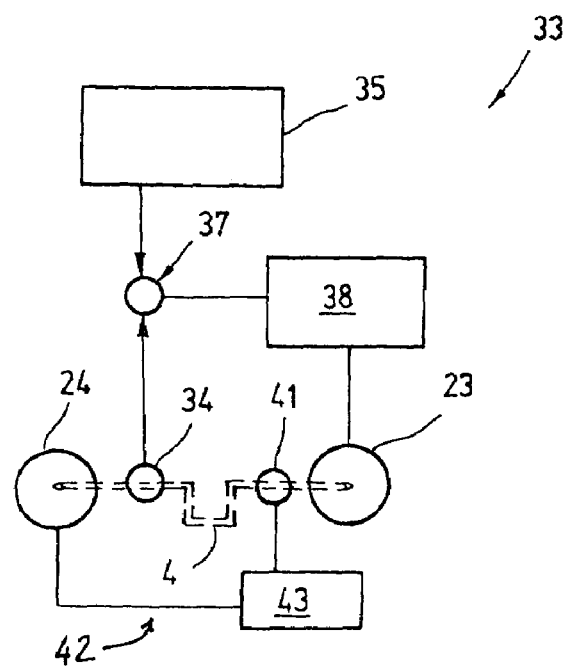
FIG. 4 shows schematically another embodiment of a control arrangement for several servomotors.

FIG. 4 shows another possible arrangement for the interconnection of two or more servomotors 23, 24 which are coupled together mechanically. First, reference is made back to the description of FIG. 3 on the basis of the reference numerals used in that figure. In the arrangement of FIG. 4, additionally, between the output of the servomotor 23 and the eccenter 4, a torque sensor 41 is arranged which is connected in a control circuit 42. The control circuit 42 includes a control amplifier 43 which provides to the servomotor 24, a control signal corresponding to the signal generated by the torque sensor 41. The servomotor 24 then supplies its power to the eccenter 4 torque measurement. In this embodiment, the master servomotor may be coupled with several slave servomotors 24, which, together, may even be stronger than the servomotor 24.

Figure 6:
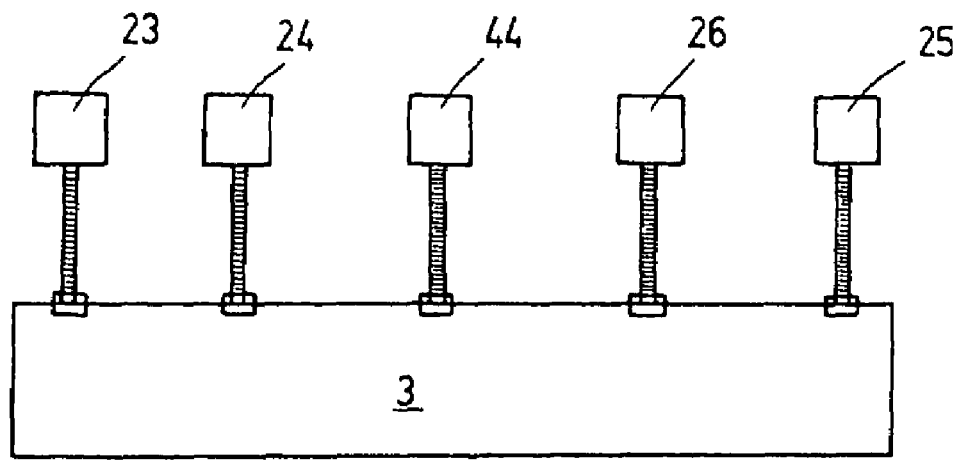
FIGS. 6 and 7 show schematically plungers which are driven by several servomotors.

FIG. 6 shows schematically a further embodiment of the invention. Here, the plunger 3 is also driven by several servomotors wherein two servomotors 23, 25 are used as masters and other servomotors 24, 26, 44 are used as slaves. The servomotors 23, 24, 25, 26 44 are not interconnected by a drive. Each has a worm gear drive which is directly connected to the plunger 3. For example, each servomotor 23, 24, 25, 26, 44 drives a linear movement spindle which is in engagement with a spindle unit connected to the plunger 3. If the spindle units are connected to the plunger 3 with a certain play, the plunger 3 may also perform pivotal movements to some extent. To this end, the servomotors 23, 25 must be controlled differently. The slave motors follow accordingly. However, it is also possible to operate the servomotor 44 as the master servomotor and use all other motors as slave motors. In this embodiment, the various spindles may be interconnected for example, by toothed belts, chains or a gear drive for common rotation.

Figure 7:
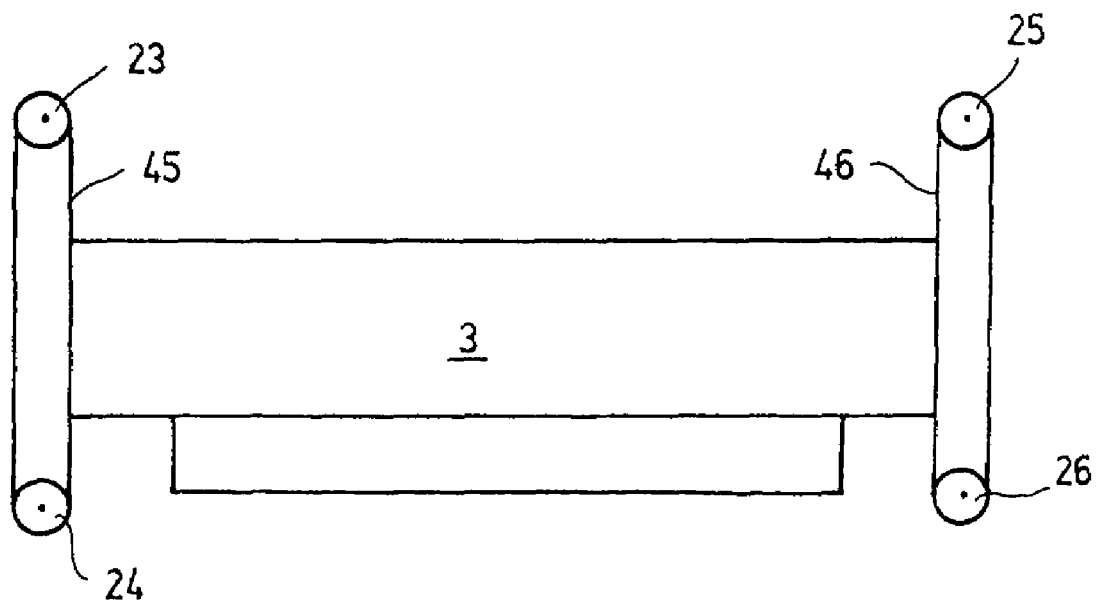

FIG. 7 shows a modified embodiment wherein the plunger 3 is operated by two servomotors 23, 24, or by four servomotors 23, 24, 25, 26. The servomotors 23 to 26 are arranged for example at the corner points of a rectangle. They may be joined in pairs by a drive means such as a toothed belt 45, 46 or a chain or similar drive structure. The drive means 45, 46, for example in the form of a toothed belt, are arranged at each end of the plunger 3. With relatively large plungers of square shape, drive means may be provided at all four corners as shown in the top view of FIG. 7. Then the plunger may be operated for example by eight or, if each guide wheel is operated by two servomotors, by altogether 16 servomotors. It is apparent that, with relatively small drive expenditures high maximum forces can be generated for opening the plunger 3.

A servo-press includes at least one plunger which is driven by several servomotors 23, 24 by way of a common drive 18. The common drive 18 includes the complete drive connections for the respective servomotors 23, 24, 25, 26 up to the plunger 3. The torques of the servomotors 28, 24 may first be transferred to a spur gear 16 or another drive element and then be converted for example by an eccenter 4 to a linear stroke movement of the plunger 3. But it is also possible to divide the drive into individual branches wherein the respective servomotors 23, 24 guide the plunger in a parallel movement. The servomotors must then be synchronized by a software based computer control arrangement for the motors. Inertia masses are not needed which permits flexible programming of the plunger operating curve. If a flywheel is employed, its size should be so selected that the servomotors can be accelerated to a nominal speed over a plunger travel of 180°.

What is claimed is:

1. A press (1) for shaping large metal sheets, comprising: a plunger (3) supported so as to be linearly movable back and forth, at least two drive means disposed at a distance from one another and connected to the plunger at spaced locations for moving the plunger (3), each drive means including at least a first servomotor (23, 25) and a second servomotor (24, 26) operatively connected via separate transmissions (28, 29, 31, 32) to the plunger (3) at said spaced locations for synchronously and uniformly moving the plunger (3), a rotatably supported inertia body (16, 17) connected to each of the servomotors (23, 24) and, respectively, (25, 26)) for rotation therewith and having each an inertia moment which is small enough so as to permit retardation of the inertia bodies for reversal of the servomotor before the end of the full plunger stroke is reached for generating an adjustable travel stroke of the plunger (3), a control device (33) connected to at least one of the servomotors of each drive means for controlling the operation of the at least one servomotor (23, 25) of each drive means on the basis of travel distance/time curves and motion transmitting means (21, 22) disposed between the inertia bodies (16, 17) so as to transmit any motion therebetween to ensure uniform movement of the plunger (3) operated by the spaced drive means for controlling the operating stroke of the plunger (3).

2. A press according to claim 1, wherein the first and second servomotors (23, 25, 24, 26) for actuating the plunger (3) are separately controlled.

3. A press according to claim 2, wherein the first to servomotors (23, 25) are position controlled and the second and any additional servomotor (24, 26) are torque controlled.

4. A press according to claim 3, wherein the control arrangement (33) provides a travel distance/time curve for the first, position controlled servomotors (23, 25) and the first, position controlled (23) servomotors (23, 25) are arranged in a control circuit (36) which controls the servomotors (23, 25) so as to follow the travel distance/time curve.

5. A press according to claim 3, wherein the control arrangement (33) provides for the torque controlled servomotors (24, 26) a torque/time curve or a torque/travel distance curve and the servomotors (24, 26) are controlled so as to follow the respective curve.

6. A press according to claim 3, wherein the position-controlled servomotors (23, 25) are is connected to a torque sensor (41) and the control arrangement (33) provides for the torquecontrolled servomotors (24, 26) a torque signal which is determined on the basis of the torque measured by the torque sensor (41).

7. A press according to claim 1, wherein the servomotors (23, 24) and, respectively, (25, 26) are connected by spur wheels (16, 28, 29) and, respectively, (17, 31, 32) to respective common eccenters (4) and, respectively, (5) for driving the plunger (3).

8. A press according to claim 1, wherein the control arrangement (33) provides for the first servomotors (23, 25) the same distance/time curve and the servomotors (23, 25) are each disposed in a control circuit which guides the respective servomotors (23, 25) in accordance with the travel distance/time curve.

9. A press according to claim 1, wherein the nominal torque of the servomotor (23) and the inertia moment of all the masses moved by the servomotor are adjusted to one another such that, under no-load conditions, the servomotor (23) can be braked down from full speed to zero over a travel length corresponding to a stroke of the plunger (3).

10. A press according to claim 1, wherein the servomotors (23, 25) are selected so as to have a torque whereby the inertia torque of the inertia bodies (16, 17) can be overcome by the servomotors (23, 25) so that the servomotors can be accelerated from zero to a predetermined maximal speed over a travel length corresponding to a plunger stroke.

11. A press according to claim 1, wherein the inertia bodies (16, 17) are spur gears and the motion transmitting means disposed between the spur gears (16, 17) are gear wheels (21, 22) in motion transmitting engagement with the spur gears (16, 17).

* * * * *